Nov. 19, 1957        D. L. McKAY        2,813,851
ORGANIC SEPARATION WITH UREA AND THIOUREA
Filed June 22, 1953
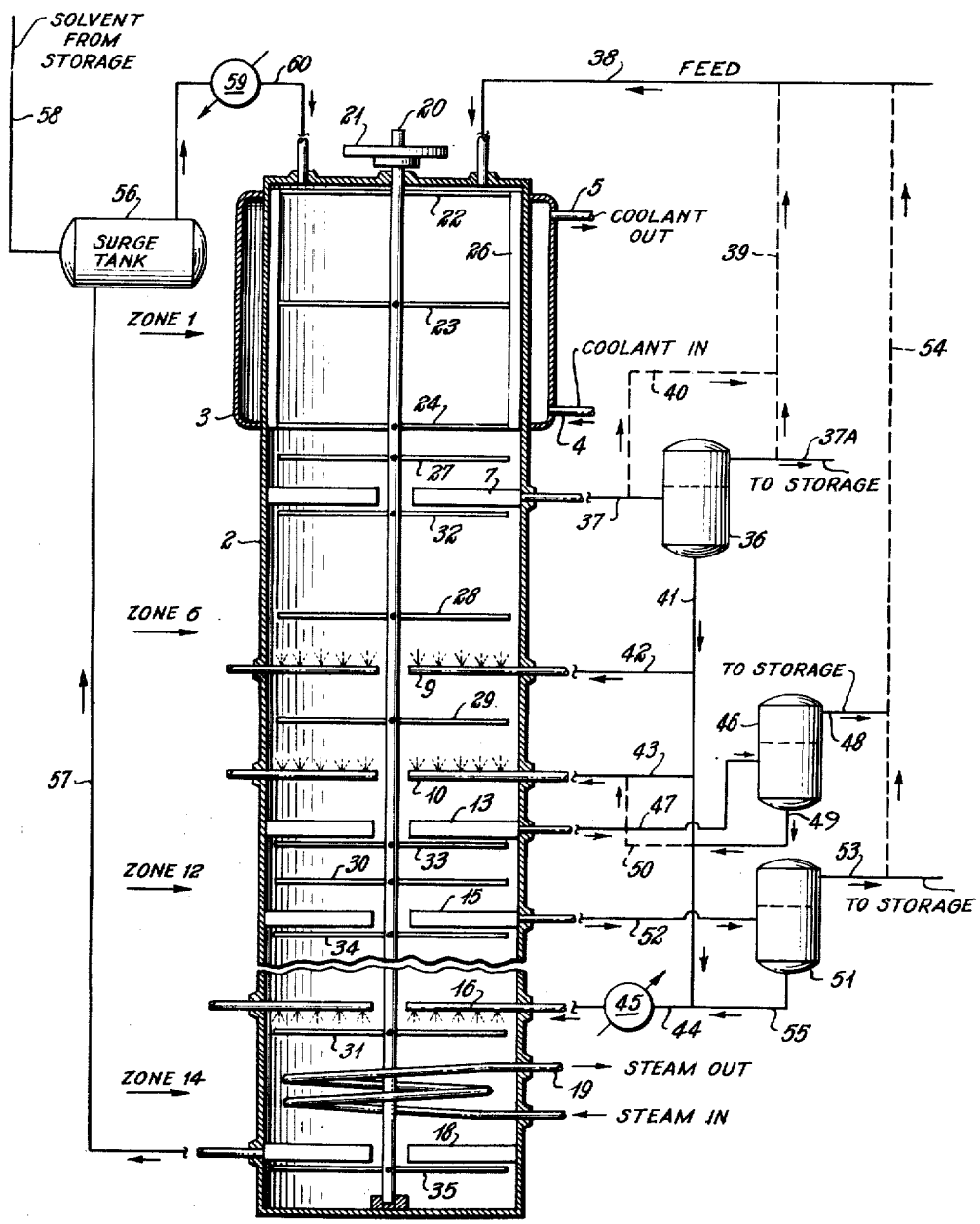
INVENTOR.
*D. L. McKay*
BY
*Hudson & Young*
ATTORNEYS

United States Patent Office 2,813,851
Patented Nov. 19, 1957

2,813,851

ORGANIC SEPARATION WITH UREA AND THIOUREA

Dwight L. McKay, Bartlesville, Okla., assignor to Phillips Petroleum Company, a corporation of Delaware Application June 22, 1953, Serial No. 363,201

16 Claims. (Cl. 260—96.5)

This invention relates to the separation of organic compounds. In one of its aspects, this invention relates to the separation of normal paraffin hydrocarbon compounds from an admixture of normal paraffins and other hydrocarbons by the formation of an adduct of the former compounds with urea or of the latter compounds with thiourea. In another of its aspects it relates to a column suitable for carrying out the process.

The use of urea or thiourea to form adducts with organic compounds for the purpose of separating close boiling fractions of these organic compounds has received considerable attention in recent years. For the purpose of this specification and the appended claims, close boiling fractions are defined as those having a boiling range within 10° C. of each other.

The use of urea or thiourea adducts for the separation of organic compounds has found particular use in the separation of naturally occurring hydrocarbons. For example it is possible to separate isooctane from normal octane or isopentane from normal pentane or normal octane from 2,2,4-trimethylhexane and the like.

The hydrocarbon mixtures to which the present invention applies may be natural occurring mixtures, or those obtained during synthesis processes, or any combination thereof. The process is especially applicable to petroleum fractionations, but also may be utilized in the purification and fractionation of isomerization mixtures, polymerization mixtures, hydrogenation products and other mixtures of materials which require purification or fractionation. It is known that urea forms crystalline molecular complexes with straight chain hydrocarbons having at least four carbon atoms, the ease of formation appears to increase with increasing molecular weight of the hydrocarbon. While urea forms adducts with straight chain organic compounds, thiourea forms adducts with branched-chain, aromatic and naphthenic organic compounds.

As already indicated hereinbefore, the organic compounds which form adducts with urea comprise compounds having substantially normal structure and compounds having predominating substituents of substantially normal chain structure. The normal compounds may be of a number of types, such as hydrocarbons, alcohols, ketones, aldehydes, esters, amines, amides, sulfides, disulfides, mercaptans, acids, halogenated compounds, ethers, etc. The hydrocarbons respond especially well to the present invention.

Typical hydrocarbons which form crystalline complexes with urea include the normal paraffin hydrocarbons such as hexane, heptane, octane, nonane, decane, undecane, dodecane, tridecane, tetradecane, pentadecane, hexadecane, heptadecane, octadecane, nonadecane, eicosane, etc. Corresponding olefins, diolefins, polyolefins, acetylenes, olefin-acetylene, etc., also form crystalline complexes with urea.

Normal alcohols, especially those having four or more carbon atoms also form complexes with urea. These include the normal aliphatic monohydric alcohols such as butyl alcohol, amyl alcohol, hexyl alcohol, heptyl alcohol, oxtyl alcohol, nonyl alcohol, carnaubyl alcohol, and the polyhydric alcohols such as ethylene glycol, diethylene glycol, propylene glycol and hexitol. Corresponding aldehydes, ketones, esters, acids, amines, amides, nitroparaffins, and their thio-analogs may also be treated according to the invention.

As already indicated hereinbefore, hydrocarbons which form complexes with thiourea are those having a predominating member which is a substantially branched radical or a naphthene radical such as alkaryl hydrocarbons wherein at least one alkyl group is an isoparaffin radical. In addition to the non-straight chain hydrocarbons which form complexes with thiourea, many derivatives thereof also form complexes with thiourea. In order to show the broad scope of the applicability of the invention, the following representative substances are listed as having been demonstrated to form solid complexes with thiourea: chloroform, methylchloroform, bromoform, tetrachloroethylene, ethylidene chloride, trimethylene bromide, carbon tertachloride, ethylene dibromide, sec-butyl bromide, n-propyl iodide, ethylene chlorohydrin, isopropyl iodide, chlorocyclohexane, bromocyclohexane, bornyl chloride, cyclohexanol, cyclohexanone, borneol, cyclohexylamine, p-methylcyclohexanol, 1,3-cyclohexanone, menthane, piperitone, fenchone, thujone, camphor, methylisobutyl ketone, methyl-n-propyl ketone, methylisopropyl ketone, mesityl oxide, diisopropyl ketone, diethyl ketone, nitrobenzene, chlorobenzene, dicyclopentadiene, ethyl oxalate, cis-1,2-dimethylcyclopentane, methylcyclohexane, trans-1,2-dimethylcyclohexane, trans-1,3-dimethylcyclohexane, cis-1,4-dimethylcyclohexane, and 2,2,4-trimethylcyclohexane, trans-1-methyl-3-cyclopentane, 1,1,3-trimethylcyclopentane, cis,trans,cis-1,2,3-trimethylcyclopentane, cis,cis,trans-1,2,4-trimethylcyclopentane, and cis,trans,cis-1,2,4-trimethylcyclopentane.

The hereinabove mentioned compounds which form adducts with urea or thiourea are illustrative of typical adduct forming compounds. Many other such compounds are found in the art.

During the adduct forming reaction, it is usually desirable to have present a suitable solvent for the amide. Some solvents may also serve as activators or catalysts for the adduct forming reaction. The crystalline nature of the adduct can be controlled by the proper selection of the solvent or solvents and the selection of the proper temperature conditions during the adduct formation. The solubility of the hydrocarbon in the primary solvent can be modified by the use of a secondary solvent or solvents such as other alcohols and glycols.

During the formation of the adduct of the amide with the organic compound, the unreacted organic compound tends to become occluded with the adduct and it is necessary to completely separate the adduct from these occluded compounds if the desired organic compound is to be recovered in a relatively pure state.

It is an object of this invention to provide a novel method of separating organic compounds.

It is another object of this invention to provide a novel process for the separation of straight chain hydrocarbons from an admixture of hydrocarbons comprised of straight chain, branched-chain, aromatic, and cyclic hydrocarbons.

It is a further object of this invention to provide a novel apparatus for the purpose of effecting the separation of straight chain organic compounds from an admixture of organic compounds comprised of straight chain, branched chain, cyclic and aromatic compounds.

Other objects and advantages of this invention will be apparent to one skilled in the art from the following discussion and disclosures in this specification and the attached drawing which is a part thereof.

The attached drawing is a schematic flow sheet of one embodiment of my invention. Auxiliary pumps, valves, etc. have been omitted.

My invention comprises the simultaneous feeding of an admixture of organic compounds and an amide selected from the group comprised of urea and thiourea in the presence of a suitable amide solvent into the top, cooled, section or zone of a vertically disposed stirred column; the formation of an amide adduct with one component or a selected group of components of the organic admixture; the adducted materials settle through a second or wash zone of the column where the adduct is washed by a counter-current flow of solvent and amide; the unreacted organic compounds are removed through a scraped filter located near the top of this section; an intermediate product comprised of unreacted organic compounds and organic compounds released by decomposition of adduct is removed in the lower section of this zone through a scraped filter similar to the hereinabove mentioned filter; the adduct settles into a third zone wherein the adduct is further washed by ascending refined organic product from a fourth or decomposition zone wherein the adduct is contacted with hot solvent-amide solution whereby the adduct is decomposed, the urea dissolved and removed in the hot solvent through a scraped filter located in the bottom of the column; refined organic product ascending from the decomposition zone is removed through a scraped filter located near the top of the fourth zone. As the adduct settles through the column, stirrers prevent channeling, these stirrers are rotated at a speed less than that which would cause turbulence. An amide is chosen which will adduct with the compound which it is desired to remove from the admixture. The hereinabove mentioned zones do not have a sharp dividing line of demarcation, but rather tend to overlap. The amide solvent chosen should have a density greater than that of the adducting compound so that the adducted organic compound will rise when released.

A solvent or a mixture of solvents and an adduct forming temperature are chosen which will promote the formation of a granular adduct; it is desirable to avoid adducts which have a vegetable shortening "Crisco" consistency. An adduct of the latter consistency will be slow settling and will cause filtering difficulties. My invention also comprises a column suitable for this process.

I will described my invention in further detail by referring to the accompanying drawing which represents a preferred method of carrying out my invention. This drawing does not include such conventional equipment as pumps, valves, compressors, and the like but the inclusion of such equipment is within the scope of my invention.

Referring now to the drawing, encompassing the upper zone 1 or section of a vertically disposed cylindrical column 2 and adjacent and sealed thereto is a fluid tight jacket 3 which is equipped with an inlet conduit 4 and an outlet conduit 5.

Disposed immediately below and adjacent to zone 1 is cylindrical zone 6, the outer jacket of said zone 6 being a continuation of column 2. Disposed in the upper part of zone 6 is a set of vacuum filters 7, said filters being attached to the jacket of column 2 and extending radially inward to a position closely spaced to a centrally located shaft 20 hereinafter described. Said vacuum filters 7 are so arranged that they have their filtering surfaces on a horizontal plane and said filtering surface face down and being so placed that there is not more than 2 linear feet between said filtering surfaces. Each filter is comprised of a perforated plate and a housing of triangular cross section, said housing communicating with a source of vacuum, not shown. Also encompassed in zone 6 and vertically spaced below filters 7 is a set of flow distributors 9 and vetrically spaced below distributors 9 is a second set of flow distributors 10. Each flow distributor is a conduit having nozzles drilled in its upper side, said distributors being attached to the jacket of column 2 extending radially inward to a position closely spaced to the hereinabove centrally located shaft 20.

Disposed immediately below and adjacent to zone 6 is cylindrical zone 12, the outer jacket of said zone 12 being a continuation of column 2. Disposed at the upper limit of said zone 12 is a second set of vacuum filters 13, said filters being attached to the jacket of column 2 and extending radially inward to a position closely spaced to the hereinabove mentioned centrally located shaft 20. These filters are arranged and constructed in the same manner as were filters 7.

Disposed immediately below and adjacent to zones 12 is cylindrical zone 14, the outer jacket of said zone 14 being a continuation of column 2. Disposed at the upper limit of said zone 14 is a third set of vacuum filters 15, said filters being attached to column 2 and extending radially inward to a position closely spaced to the centrally located shaft 20. These filters are arranged and constructed in the same manner as were filters 7 and 13. Disposed below filters 15 is a third set of flow distributors 16, each of which is a conduit having nozzles drilled in its lower side, said distributors being attached to the jacket of column 2 extending radially inward to a position closely spaced to the centrally located shaft 20. Disposed near the lower limit of zone 14 and near the bottom of the column is a fourth set of vacuum filters 18. These filters 18 are attached, arranged and constructed in the same manner as were filters 7, 13 and 15. Disposed in zone 14 between flow distributors 16 and filters 18 is a heater 19.

Centrally located in column 2 and mounted in suitable bearings is a rotatable shaft 20 hereinbefore referred to. Attached to said shaft near its upper extremity is a gear or pulley 21, said gear or pulley communicating with a motor, not shown, or other means for rotating said shaft. Firmly attached to said shaft and extending radially therefrom to a position closely spaced to the shell of column 2 are a plurality of sets of stirrers disposed and vertically spaced in the column 2. Stirrer sets 22, 23, and 24 are disposed in zone 1 and are vertically spaced one below the other. Attached to each said stirrer of the sets 22, 23 and 24 at their outer extremity are scrapers 26, said scrapers being closely spaced to or contacting the inside surface of column 2. The remaining sets of stirrers hereinbelow mentioned are firmly attached to the shaft 20, extending radially therefrom to a position closely spaced to the inside surface of column 2, set 27 being disposed between zone 1 and filter set 7, set 28 between filter set 7 and flow distributors 9, set 29 between flow distributors 9 and 10, set 30 between filters 13 and 15, and set 31 between flow distributors 16 and filters 18. The said stirrers are designed so as to minimize turbulences, generally being round rods.

Sets of scrapers 32, 33, 34 and 35 are firmly attached to shaft 20, extending radially therefrom to a position closely spaced to the jacket of column 2, set 32 being vertically spaced so as to be closely spaced to or contacting the filtering surfaces of filters 7, set 33 being vertically spaced so as to be closely spaced to or contacting the filtering surfaces of filters 13, set 34 being vertically spaced so as to be closely spaced to or contacting the filtering surfaces of filters 15, and set 35 being vertically spaced so as to be closely spaced to or contacting the filtering surfaces of filters 18.

The hereinabove mentioned sets of filters 7 communicate with a separator vessel 36 via conduit 37. The said separator communicates with a storage vessel, not shown, via conduit 37A, said conduit 37A being provided with a bypass conduit 39 to the column feed conduit 38. There is also provided a bypass conduit 40 communicating between conduits 37 and 39. The separator 36 communicates with flow distributors 9 via conduit 41 and 42, with flow distributors 10 via conduits 41 and 43, and with flow distributors 16, via conduit 41, 44 and heater 45.

The hereinabove mentioned set of filters 13 communicates with a separator vessel 46 via conduit 47, the said separator communicating with a storage vessel, not shown, via conduit 48. Conduit 48 is provided with a bypass conduit 54 communicating with the feed conduit 38. The said separator 46 communicates with flow distributors 10 via conduits 49, 50 and 43, and with flow distributors 16 via conduits 49, 41, 44 and heater 45.

The hereinabove mentioned set of filters 15 communicates with a separator vessel 51 via conduit 52, the said separator communicating with a storage vessel, not shown, via conduit 53. Conduit 53 is provided with a bypass conduit 54 communicating with the feed conduit 38. The said separator vessel 51 communicates with flow distributor 16 via conduits 55, 44 and heater 45.

The hereinabove mentioned set of filters 18 communicates with a surge tank 56 via conduit 57, said surge tank being provided with an inlet conduit 58 and said surge tank communicating with the top of column 2 through cooler 59 via conduit 60.

The hereinabove described column is one embodiment of my invention and should not be taken as limiting in any sense. It will be apparent to those skilled in the art that many changes can be made without departing from the scope thereof. For example, the cooling jacket 3 can be replaced by a cooling coil or the jacket or coil can be encompassed within the column. The stirrers may have "fingers" attached thereto and thereby providing for a raking motion. More or fewer stirrers may be used. For example, sets of stirrers 23, 27 and 31 could be eliminated or an additional set of stirrers can be used, for example, disposed between flow distributors 10 and filters 13. The filters may be flat on top with additional scrapers or brushes provided to scrape the tops, or the long radially disposed filters can be replaced by numerous smaller filters each having a conical or tetrahedral covering. Although I have described my column in terms of vacuum filters, other means for removing liquid may be employed. For example, if the column is operated under pressure, no vacuum would be required. In operating filters, it is usual to provide for means for backwashing the filters. It is within the scope of my invention to do so. For example, a conduit can be provided from the bottom of the separators back to the filters with the necessary valves, pumps, etc. Those skilled in the art will see many such modifications which can be made.

I will further describe the process of my invention by describing a typical hydrocarbon separation process utilizing the column of my invention. This wil lbe done by referring to the accompanying drawing, but it should be understood that this is only one embodiment of my invention and is not to be taken as limiting in any sense.

Referring now to the drawing, a hydrocarbon feed comprising a mixture of straight chain paraffins and branched-chain paraffins is introduced into the adduct forming zone 1 of column 2 via conduit 38. At the same time a cooled solution of urea in methanol is introduced into this same adduct forming zone via conduit 60. A coolant is pumped through the cooling jacket 3 and the adduct forming zone is kept at approximately 80° F. The normal paraffin in the feed will adduct with the urea and the adduct thus formed will begin to settle or gravitate. As the adduct forms, unreacted hydrocarbons will be occluded in the adducted structure. Two or three banks of stirrers such as 22, 23 and 24 will prevent channeling in this zone as the adduct settles. Scrapers 26 will prevent adduct buildup on the column wall. In the upper portion of solvent washing zone 6, some solvent and urea along with unreacted hydrocarbons is removed through vacuum filters 7 to separator 36, the unreacted hydrocarbons are removed from said separator and sent to storage, or are recirculated to the feed conduit. Recirculation of the hydrocarbons may be necessary when the column temperature gets out of control and some normal paraffins remain in the unreacted hydrocarbon admixture. The methanol urea solution is returned to the column through the solvent distributors 9 and 10 via conduits 41, 42, and 43 from whence the solvent ascends counter-current to the descending adduct and washes most of the occluded unreacted hydrocarbons from the adduct. The solvent and the unreacted hydrocarbons will rise in the column to filters 7 where they will be removed, separated, the hydrocarbon removed to storage, and the solvent recirculated. A portion of the solvent being returned through the lower distributors 10 will be drawn down to filters 13. The adduct, after being washed as hereinabove described, will still contain some unreacted hydrocarbons occluded in the adduct. This adduct, as it descends into purification zone 12 past filters 13, will come into contact with a counter-current flow of hot solvent and purified n-paraffins. The adduct will begin to soften and the remaining occluded hydrocarbons will be removed. Most of the n-paraffins and unreacted hydrocarbons along with some solvent will be removed through filters 13 to separator 46 via conduit 47. This intermediate hydrocarbon product will be high in n-paraffins being something over 90% n-paraffins. The hydrocarbon will be removed to storage or recirculated as desired. The solvent will be returned to the column through distributors 10 where part of it will ascend through zone 6 to filters 7 where it is removed and recirculated and part of it will be pulled down to filters 13 where it is removed and recirculated. Provision is also made to return some of the solvent from separator 46 to the column through the hot solvent distributors 16 via conduits 49, 41, 44 and solvent heater 45. The latter will be necessary when there is not sufficient solvent being returned from separator 51 hereinbelow discussed.

As the adduct further settles past filters 15 into adduct decomposition zone 14, it comes into contact with hot solvent at a temperature of approximately 150° F. This hot solvent decomposes the adduct into its component parts of methanol-urea solutions and n-paraffins. The paraffins and part of the solvent will rise and a large portion of these materials will be removed from the column through filters 15 to separator 51 via conduit 52. Part of the n-paraffin and solvent will ascend past the filters into zone 12 where it will soften and wash the descending adduct. The refined hydrocarbon product of 99%+ n-paraffins withdrawn through filter 15 will be removed from the said separator to storage. The solvent from separator 51 will be returned to the column through solvent distributors 16 via conduits 55, 44 and heater 45 whereby the solvent temperature will be raised to approximately 150° F. A portion of this hot solvent will rise and contact the descending adduct causing the adduct to decompose as hereinabove described. The remainder of the solvent will be drawn down to filters 18 through which said solvent is removed.

The solvent removed from the column through filters 18 is pumped to surge tank 56 via conduit 57 where make up solvent and urea can be added. From the surge tank the solvent is cooled in cooler 59 to approximately 80° F. and is then conveyed to the adduct forming zone 1 of the column 2 via conduit 60.

Then centrally located shaft 20 is rotated at a speed less than that which would cause turbulences, since the purpose of the stirrers is to prevent channeling and to keep the adduct settling. Turbulence would cause rises and falls in the adduct thus slowing the settling.

I have described the process of my invention in terms of one of its preferred embodiments. It will be appreciated by those skilled in the art that many modifications can be made thereof without digressing from the scope and spirit of my invention. Other organic compounds, amides, and solvents have been herein listed. I have described my invention in terms of the adduct gravitating or settling. Other means may be employed for moving the adduct downward through the column, for example, if the solvent and feed stock enters the column under pressure and the material removed by vacuum, the pressure drop will account for part of the moving force.

It is apparent that an adduct of a granular structure would be handled in my column with greater ease than would one of a more colloidal nature. It is, therefore, important to choose a solvent or mixture of solvents and an adduct forming temperature which will be conducive to granular formations. The hot solvent temperature must be high enough to insure decomposition of the adduct.

I have provided a method and a column for practicing my method for the separation and recovery of a high purity organic compound or compounds from a mixture of said compound or compounds and other organic compounds without the use of a separate decomposition and fractionation vessel. By providing for the backwash of the adduct, or internal reflux, with purified hydrocarbon obtained from adduct decomposition, an organic compound of a purity in excess of 99% can be obtained.

From the above description of my process and column the advantage thereof will be appreciated by those skilled in the art. It will also be apparent that various modifications of my process and column can be used without digressing from the scope and spirit of my invention.

I claim:

1. A process for separating organic compounds by the formation of adducts with an amide selected from the group consisting of urea and thiourea in the presence of an amide solvent of greater density than the adduct forming material which process comprises reacting an amide with a stream including adduct forming materials to form crystals of adduct in an adduct forming zone, descending said crystals from the reaction zone to a wash zone wherein the descending crystals are washed by a counter-current flow of amide solvent, withdrawing amide solvent along with unadducted compounds from the top of said wash zone through filters separating the amide solvent from the unadducted compounds, passing the separated amide solvent counter-current to the descending adduct thereby washing the said adduct, descending the adduct crystals into a purification zone wherein the descending adduct is washed by an ascending flow of hot released adducted material thereby removing occluded material from the adduct crystals, removing the said hot released compound along with some amide solvent through a filter near the top of the purification zone, separating the organic compound from the amide solvent, returning the amide solvent to the separation system as wash solvent, descending said crystals from the purification zone to a decomposition zone, supplying heat to said decomposition zone to decompose the adduct and thereby regenerating said amide and releasing adducted material, dissolving said regenerated amide in an amide solvent, withdrawing amide solution along with a large portion of released organic compound through filters, separating the solvent containing amide from the organic compound, heating the solvent and returning it to the decomposition zone of the column wherein it contacts adduct crystals thereby causing them to decompose, withdrawing a large portion of released organic compound as hereinbefore stated, passing the remainder of said released material counter-current to the descending adduct as internal reflux whereby occluded material is removed from the said descending adduct.

2. A process for separating organic compounds by the formation of adducts with an amide selected from the group consisting of urea and thiourea in the presence of an amide solvent of greater density than the adduct forming material which process comprises reacting an amide with a stream including adduct forming materials to form crystals of adduct in an upper reaction zone, descending said crystals from the reaction zone to a wash zone wherein the descending crystals are washed by a counter-current flow of amide solvent, withdrawing solvent along with unadducted compounds from the top of said wash zone through filters, separating the solvent from the unadducted compounds, returning the solvent to the system wherein the solvent rises counter-current to the descending adduct thereby washing the said adduct, descending the adduct crystals into a purification zone wherein the descending adduct is washed by an ascending flow of hot released adducted material thereby removing occluded material from the adduct crystals, removing the said hot released compound along with some solvent through a filter near the top of the purification zone, separating the organic compound from the solvent, returning the solvent to the system as wash solvents, descending said crystals from the purification zone to a decomposition zone, supplying heat to said decomposition zone to decompose the adduct and thereby regenerating said amide and releasing adducted material, dissolving said regenerated amide in solvent, withdrawing amide in solvent along with a large portion of released organic compound through filters separating the solvent containing amide from the organic compound, heating the solvent and returning it to the decomposition zone of the system wherein it contacts adduct crystals thereby causing them to decompose, withdrawing a large portion of released organic compound as hereinbefore stated, passing the remainder of said released material counter-current to the descending adduct as internal reflux whereby occluded material is removed from the said descending adduct, dissolving amide released by decomposing adduct in hot solvent, removing the amide in solvent through filters, cooling said solvent containing amide, returning the cooled solution to the adduct forming zone.

3. A process for separating organic compounds by the formation of adducts with an amide selected from the group consisting of urea and thiourea in the presence of an amide solvent of greater density than the adduct forming material which process comprises reacting an amide with a stream including adduct forming materials to form crystals of adduct is an upper reaction zone, gravitating said crystals from the reaction zone to a wash zone wherein the gravitating crystals are washed by a counter-current flow of amide solvent, withdrawing solvent along with unadducted compounds from the top of said wash zone through filters separating the solvent from the unadducted compounds, returning the solvent to the system wherein the solvent rises counter-current to the gravitating adduct thereby washing the said adduct, gravitating the adduct crystal into a purification zone wherein the gravitating adduct is washed by an ascending flow of hot released adducted material thereby removing occluded material from the adduct crystals, removing the said hot released compounds along with some solvent through a filter near the top of the purification zone, separating the organic compounds from the solvent, returning the solvent to the system as wash solvent, gravitating said crystals from the purification zone to a decomposition zone, supplying heat to said decomposition zone to decompose the adduct and thereby regenerating said amide and releasing material, dissolving said regenerated amide in solvent, withdrawing amide in solvent along with a large portion of released organic compound through filters, separating the solvent containing amide from the organic compound, heating the solvent and returning it to the decomposition zone of the system wherein it contacts adduct crystals thereby causing them to decompose, withdrawing a large portion of released organic compound as hereinbefore stated, passing the remainder of said released material counter-current to the gravitating adduct as internal reflux whereby occluded material is removed from the said gravitating adduct, dissolving amide released by decomposing adduct in hot solvent, removing the amide in solvent through filters, cooling said solvent containing amide, returning the cooled solution to the adduct forming zone and stirring the gravitating adduct crystals throughout the system at a speed which does not create turbulence thereby aiding gravitation and preventing channeling of the counter-current streams.

4. The process of claim 3 wherein the organic compounds are hydrocarbons.

5. The process of claim 4, wherein the hydrocarbons are comprised of normal paraffins and branched-chain paraffins, the amide is urea, the amide solvent is methanol and the adducted compounds are normal paraffins.

6. The process of claim 4 wherein the hydrocarbons are n-heptane and at least one member selected from the group consisting of cis-1,2-dimethylcyclopentane and methylcyclohexane.

7. The process of claim 4 wherein the hydrocarbons are n-octane and at least one member selected from the group consisting of trans-1,2-dimethylcyclohexane, trans-1,3-dimethylcyclohexane, cis - 1,4 - dimethylcyclohexane, and 2,2,4-trimethylhexane.

8. The process of claim 4 wherein the hydrocarbons are n-nonane and at least one member selected from the group consisting of trans-1-methyl-3-cyclopentane, 1,1,3-trimethylcyclopentane, cis, trans, cis-1,2,3-trimethylcyclopentane, cis, cis, trans-1,2,4-trimethylcyclopentane, and cis,trans-cis-1,2,4-trimethylcyclopentane.

9. In a vertically disposed cylindrical column for the separation of organic compounds by the formation of amide adducts, the said column being comprised of at least two sections, means for introducing feed to an upper level of the top section means for cooling said top section, a first set of filters having their filtering surfaces on a horizontal plane and facing downwardly disposed beneath the said top section, two sets of filters having their filtering surfaces on a horizontal plane and facing downwardly disposed within a lower section, two sets of flow distributors disposed between the said first set of filters and the said two sets of filters, a third set of flow distributors disposed below the said two sets of filters, means for removing liquid through said filters, means for adding liquid through said flow distributors, a rotatable shaft journaled axially in said column, stirrers attached to said shaft extending radially therefrom to a position closely spaced to the column walls and means for removing liquid from a low level of said lower section.

10. In a vertically disposed cylindrical column for the separation or organic compounds by the formation of adducts with an amide, the said column being comprised of an upper section, means for cooling said upper section, means for introducing liquid feed and amide to said upper section a second section disposed below and adjacent to said upper section, a plurality of filters having their filtering surfaces on a horizontal plane and facing downwardly in the upper portion of said second section, a plurality of sets of vertically spaced distributors disposed below said filters and within said second section, a plurality of sets of filters having their filtering surfaces on a horizontal plane and facing downwardly vertically spaced and disposed below the said sets of flow distributors, a plurality of sets of vertically spaced flow distributors disposed below the sets of filters, means for removing liquid through the said filters, means for separating said removed liquid into two phases, means for returning one phase to the column through said flow distributors, means for heating part of the returned phase, a set of filters having their filtering surfaces on a horizontal plane and facing downwardly closely spaced to the bottom of said column, means for withdrawing liquid from said column through last said set of filters, means for cooling said withdrawn liquid, means for returning said cooled liquid to said upper zone of the column, an axially disposed rotatable shaft journaled in said column, a plurality of sets of stirrers vertically spaced along said shaft and disposed within the said column, and means for removing solid material from the filtering surfaces of said filters.

11. In a vertically disposed cylindrical column for the separation of organic compounds by the formation of adducts with an amide, the said column being comprised of an upper section, means for cooling said upper section, a second section disposed below and adjacent to said upper section, a first set of filters in the upper portion of said second section, said filters being arranged with their filtering surfaces facing down and on a horizontal plane, two sets of vertically spaced distributors disposed below said filters in said second section, means for removing material from the column through said filters, means for returning material to the column through the said two sets of flow distributors, a third section disposed below and adjacent to said second section, a second set of filters, said second set of filters being vertically spaced near the upper limit of the said third section and being arranged with their filtering surfaces facing down and on a horizontal plane, means for removing material from the column through said second set of filters, a fourth section disposed below and adjacent to said third section, a third set of filters disposed and vertically spaced in the upper portion of the said fourth section, said third set of filters being arranged with their filtering surfaces facing down and on a horizontal plane, a third set of flow distributors disposed within said fourth section and vertically spaced below said third set of filters, means for removing material from the column through said third set of filters, means for heating material and passing heated material to the column through said third set of flow distributors, a fourth set of filters disposed within said fourth section and closely spaced to the bottom of the column, said fourth set of filters having their filtering surfaces facing down and on a horizontal plane, means for withdrawing material from the column through said fourth set of filters, means for cooling material, and means for returning material to the column in the first section.

12. In a vertically disposed cylindrical column for the separation of organic compounds by the formation of adducts with an amide, the said column being comprised of an upper section, means for cooling said upper section, disposed below and adjacent to said upper section a second section, a first set of filters in the upper portion of said second section, said filters being arranged with their filtering surfaces facing down and on a horizontal plane, two sets of vertically spaced distributors disposed below said filters in said second section, means for removing material from the column through said filters, means for returning material to the column through the said two sets of flow distributors, a third section disposed below and adjacent to said second section, a second set of filters, said second set of filters being vertically spaced near the upper limit of the said third section and being arranged with their filtering surfaces facing down and on a horizontal plane, means for removing material from the column through said second set of filters, a fourth section disposed below and adjacent to said third section, a third set of filters disposed and vertically spaced in the upper limit of the said fourth section, said third set of filters being arranged with their filtering surfaces facing down and on a horizontal plane, a third set of flow distributors disposed within said fourth section and vertically spaced below said third set of filters, means for removing material from the column through said third set of filters, means for heating material and returning heated material to column through said third set of flow distributors, a fourth set of filters disposed within said fourth section and closely spaced to the bottom of the column, said fourth set of filters having their filtering surfaces facing down and on a horizontal plane, means for withdrawing material from the column through said fourth set of filters, means for cooling said material, means for returning said cooled material to the column in the first section, a rotatable shaft mounted in suitable bearings, said shaft being disposed vertically and centrally spaced within the column stirrers being attached to and vertically spaced throughout the column upon said shaft extending radially therefrom to a position closely spaced to the wall of the column.

13. In a vertically disposed cylindrical column for the separation of organic compounds by the formation of adducts with an amide, the said column being comprised of an upper section, means for cooling said upper section, disposed below and adjacent to said upper section a second section, a first set of vacuum filters disposed in the upper portion of said second section, said vacuum filters being arranged with their filtering surfaces facing down and on a horizontal plane, a first set of flow distributors disposed and vertically spaced in said second section below said first set of vacuum filters, a second set of flow distributors disposed and vertically spaced in said second section below the said first set of flow distributors, a third section disposed below and adjacent to said second section, a second set of vacuum filters disposed in the upper portion of said third section and vertically spaced below the second set of flow distributors, a fourth section disposed below and adjacent to said third section, a third set of vacuum filters disposed in the upper level of said fourth section and vertically spaced below the second set of vacuum filters, a third set of flow distributors disposed within said fourth section and vertically spaced below the third set of vacuum filters, a fourth set of vacuum filters disposed in the fourth section and closely spaced to the bottom of the column, means for supplying heat to the said fourth section, a vertical rotatable shaft mounted in suitable bearings disposed and centrally located in the column, three sets of stirrers disposed in the first section of the column and vertically spaced one beneath the other, scrapers attached to the outer extremities of said stirrers and closely spaced to the wall of the column a fourth set of stirrers disposed and vertically spaced between the first section of the column and the first set of vacuum filters, a fifth set of stirrers disposed and vertically spaced between the first set of vacuum filters and the first set of flow distributors, a sixth set of stirrers disposed and vertically spaced between the first and second set of flow distributors, a seventh set of stirrers disposed and vertically spaced between the second and third sets of filters, an eighth set of stirrers disposed and vertically spaced between the third set of flow distributors and the fourth set of vacuum filters, each stirrer of the said sets of stirrers being attached to the rotatable shaft and extending radially therefrom to a position closely spaced to the column wall, sets of scrapers attached to the rotatable shaft and extending radially therefrom to a position closely spaced to the column wall, the first set of said scrapers being disposed and vertically spaced as to be closely spaced to the filtering surface of the first set of vacuum filters, the second set of scrapers being disposed and vertically spaced so as to be closely spaced to the filtering surfaces of the second set of vacuum filters, the third set of scrapers being disposed and vertically spaced as to be closely spaced to the filtering surface of the third set of vacuum filters, the fourth set of said scrapers being disposed and vertically spaced so as to be closely spaced to the filtering surfaces of the fourth set of vacuum filters, a conduit communicating between the fourth set of vacuum filters and a cooler, a conduit communicating between said cooler and the top of the column, a conduit communicating to top of said column, a first separator vessel, a conduit communicating between the first set of vacuum filters and said separator vessel, a conduit communicating from said separator vessel to a storage vessel, a conduit communicating between said separator vessel and the conduit communicating to the top of the column, a conduit communicating between said separator and the first two flow distributors, a second separator vesssel, a conduit communicating between the second set of vacuum filters and the second separator vessel, a conduit communicating between said second separator vessel and a second storage vessel, a conduit communicating between said second separator vessel and the second set of flow distributors, a conduit communicating between the second separator vessel and a heater, a conduit communicating between said heater and the third set of flow distributors, a third separator vessel, a conduit communicating between the third set of vacuum filters and said third separator vessel, a conduit communicating between the third separator vessel and a third storage vessel, and a conduit communicating between the third separator vessel and the aforesaid heater, from whence a conduit communicates to the third set of flow distributors.

14. The column of claim 12 wherein the means for cooling the first section comprises a fluid tight jacket completely surrounding the first section of the column, said jacket being provided with an inlet conduit and an outlet conduit.

15. The column of claim 13 wherein each filter of the said sets of filters is attached to the outer perimeter of the column and extends radially inward to a position closely spaced to the rotatable shaft, each said filter being comprised of a perforated plate covered by a housing of triangular cross section, said filters communicating with a vacuum source.

16. A process for separating organic compounds by the formation of adducts with an amide selected from the group consisting of urea and thiourea in the presence of a solvent for said amide, said solvent being of greater density than the adduct forming material said process comprising reacting said amide with a stream including an adduct forming material in an adduct forming zone so as to form crystals of adduct, passing said crystals from said adduct forming zone through a wash zone wherein said crystals are washed by a countercurrent flow of amide solvent, withdrawing amide solvent along with unadducted compounds from that end of said wash zone wherein said crystals enter, separating said solvent from said unadducted compounds so removed, introducing said amide solvent to said wash zone remote from said end wherein solvent and unadducted material are withdrawn and passing same countercurrent to said adduct as said countercurrent flow of amide solvent, passing the washed adduct crystals into a purification zone wherein the crystals are further washed by a countercurrent flow of hot released adducted material thereby removing occluded material therefrom, removing said hot released compound along with some amide solvent from the purification zone at that end wherein said crystals enter, separating the adduct forming material from the amide solvent, passing said crystals from the purification zone to a decomposition zone, supplying heat to said decomposition zone to decompose the adduct and thereby regenerating said amide and releasing adducted material, dissolving said regenerated amide in amide solvent, withdrawing amide solution along with a major portion of released organic compound, separating the amide solution from the adduct forming compound so withdrawn, recovering the thus separated adduct forming compound as product, introducing said amide solvent, heated, to the purification zone and passing the remainder of said released adduct forming material in said decomposition zone to said purification zone countercurrent to said crystals as internal reflux.

References Cited in the file of this patent
UNITED STATES PATENTS

| | | |
|---|---|---|
| 956,065 | Fleming | Apr. 26, 1910 |
| 2,375,256 | Soday | May 8, 1945 |
| 2,588,506 | Fetterly | Mar. 11, 1952 |
| 2,620,263 | Macklin | Dec. 2, 1952 |
| 2,627,513 | Arey | Feb. 3, 1953 |
| 2,637,681 | Arnold et al. | May 5, 1953 |
| 2,656,342 | Kimberlin et al. | Oct. 20, 1953 |
| 2,681,337 | Gorin | June 15, 1954 |
| 2,696,506 | Smith et al. | Dec. 7, 1954 |
| 2,700,664 | Weedman et al. | Jan. 25, 1955 |

UNITED STATES PATENT OFFICE

CERTIFICATE OF CORRECTION

Patent No. 2,813,851                                                    November 19, 1957

Dwight L. McKay

It is hereby certified that error appears in the printed specification of the above numbered patent requiring correction and that the said Letters Patent should read as corrected below.

Column 5, line 46, for "wil lbe" read -- will be --; column 6, line 58, for "Then" read -- The --; column 8, line 36, for "adduct is" read -- adduct in --; line 55, after "releasing" insert -- adducted --.

Signed and sealed this 18th day of February 1958.

(SEAL)
Attest:

KARL H. AXLINE
Attesting Officer

ROBERT C. WATSON
                                                                       Commissioner of Patents